US012706809B2

(12) United States Patent
Brown et al.

(10) Patent No.: US 12,706,809 B2
(45) Date of Patent: Aug. 11, 2026

(54) MANAGING CLOUD-NATIVE VIRTUAL NETWORK FUNCTIONS

(71) Applicant: Microsoft Technology Licensing, LLC, Redmond, WA (US)

(72) Inventors: Michael Anthony Brown, McKinney, TX (US); Ronald Mark Parker, Manchester, MA (US); Calum Sutherland Loudon, Edinburgh (GB); Adam Scott Dorenter, Flemington, NJ (US); Paul John Brittain, Redmond, WA (US); Bahareh Sadeghi, Vancouver, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 18/742,644

(22) Filed: Jun. 13, 2024

(65) Prior Publication Data

US 2025/0310205 A1 Oct. 2, 2025

Related U.S. Application Data

(60) Provisional application No. 63/570,711, filed on Mar. 27, 2024.

(51) Int. Cl.

| | |
|---|---|
| ***H04L 41/12*** | (2022.01) |
| ***H04L 67/02*** | (2022.01) |
| ***H04L 67/10*** | (2022.01) |

(52) U.S. Cl.
CPC .............. *H04L 41/12* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 12,219,473 B2 * | 2/2025 | Buyukdura | H04W 48/18 |
| 2024/0121156 A1 * | 4/2024 | Yao | H04L 41/40 |
| 2024/0214258 A1 * | 6/2024 | Parker | H04L 41/0226 |
| 2024/0223446 A1 * | 7/2024 | Parker | H04W 24/02 |
| 2025/0184265 A1 * | 6/2025 | Bhangu | H04L 41/20 |

* cited by examiner

*Primary Examiner* — Quang N Nguyen
(74) *Attorney, Agent, or Firm* — Ray Quinney & Nebeker P.C.; James S. Bullough

(57) ABSTRACT

The present disclosure generally relates to systems, methods, and computer-readable media for managing cloud-native virtual network functions (CNFs) in a telecommunication network environment. The systems described herein involve receiving a request and determining or otherwise identifying a specific infrastructure solution based at least in part on attributes of the request. After determining the infrastructure solution, the systems described herein facilitate translating requests between a standardized API and solution-specific APIs to facilitate integration with a variety of cloud-native management solutions while also minimizing impact to existing service-based management architectures (SBMA) of fifth generation (5G) operations administration and management (OAM) systems.

18 Claims, 8 Drawing Sheets

MANAGING CLOUD-NATIVE VIRTUAL NETWORK FUNCTIONS

CROSS-REFERENCE TO RELATED APPLICATIONS

This application claims priority to and the benefit of U.S. Provisional Patent Application No. 63/570,711, filed Mar. 27, 2024, which is incorporated by reference in its entirety.

BACKGROUND

A cloud computing system refers to a collection of computing devices capable of providing remote services and resources. Indeed, cloud computing systems can provide a variety of services including storage, databases, networking, software, and analytics services. The use of cloud computing technology has grown rapidly in recent years. This is due at least in part to the development of high-capacity networks as well as reduced costs for computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet. A "hybrid cloud" architecture is the combination of public and private clouds by a wide area network or broadband connection.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the Internet. IaaS enables end users to scale and shrink resources on an as-needed basis, reducing the need for large, up-front capital expenditures. This can be particularly beneficial for users who anticipate having variable workloads.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1:
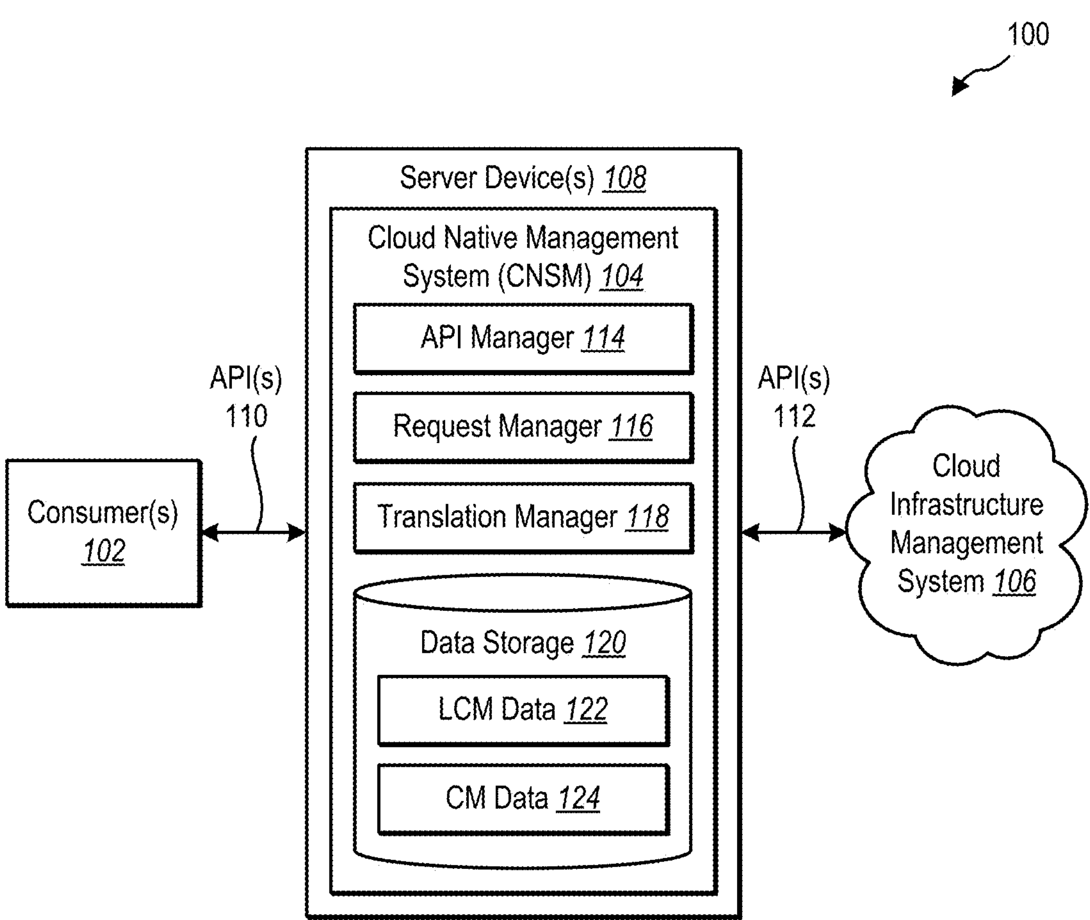
FIG. 1 illustrates an example environment including a cloud native management system (e.g., a CNSM producer) implemented in a telecommunications network environment in accordance with one or more embodiments.

The present disclosure generally relates to systems, methods, and computer-readable media for managing cloud-native virtual network functions (CNFs) implemented in a telecommunication environment (e.g., a $3^{rd}$ Generation Partnership Project (3GPP) environment). The systems described herein involve specifying a variety of possible management solutions and/or associated platforms for a telecommunication network management system (such as a standards-defined or other management system) that facilitates integration with a variety of cloud-native management solutions while also minimizing impact to existing service-based management architectures (SBMA) of fifth generation (5G) operations administration and management (OAM) systems.

5G Service Based Management Architecture (SBMA) and other service-based architectures (SBA) are based on technologies known from the internet, i.e., the Service-Oriented Architecture (SOA) and Representational State Transfer (REST). SOA consists of the components including a Service Repository, Service Consumer and Service Provider. A Service Producer publishes its service(s) to the Service repository and a Service Consumer queries the Service Repository for a Service Provider for a specific Server. The Service Consumer queries or subscribes to events of the requested service. Network Functions (NF) of SBA can act according to one or more roles of the three and, depending on the NF, can consume a service from one NF but notify other NFs as a producer at the same time. SBA in 5G defines a variety of NFs, including (by way of example): Access and Mobility management Function (AMF), Session Management Function (SMF), User Plane Function (UPF), Policy Control Function (PCF), Network Exposure Function (NEF), Network Repository Function (NRF), Unified Data Management (UDM), Unified Data Repository (UDR), Authentication Server Function (AUSF), Application Function (AF), Network Slice Selection Function (NSSF).

Iterations of 3GPP SA (e.g., 3GPP SA5) have conducted studies on cloud aspects of management and orchestration with regard to cloud-native network functions, also known as containerized network functions. The goal of this study item is to identify the gaps in 3GPP management system for management of cloud-native network functions (CNFs) in the context of the ETSI NFV MANO framework. The ETSI NFV MANO framework has deficiencies, making it heavy and cumbersome to deploy. Furthermore, the NFV MANO framework has a large overhead, and it is not efficient for managing decentralize infrastructure. ETSI NFV MANO framework often requires the consumers to select a specific Application Programming Interface (API) based on the service they request. ETSI NFV MANO was built to manage VNFs, and hence it has gaps when it comes to management of cloud-native network functions (CN VNF).

While cloud-native network functions (NFs) can be managed by use of conventional standards with some modifications, there are additional solutions for management of cloud-native NFs that need to be supported by 3GPP systems. For example, widely deployed and used solutions for management of cloud-native applications, such as Kubernetes and Helm charts among others need to be supported by 3GPP systems. These widely deployed and used solutions are referred to herein as de-facto standards for management of cloud-native applications and can be used for management of CNFs.

As will be discussed in further detail herein, one or more embodiments of a telecommunication network cloud-native management system (CNSM) producer provides a solution to facilitate support for these and other solutions for management of cloud-native NFs. Indeed, features and functionality of one or more embodiments of a cloud native management system (used interchangeably herein as a “CNSM producer”, “CNSM”, “producer” or “CNSM proxy”) may specify an architecture for telecommunication network management system that enables seamless integration with a variety of cloud-native management solutions while minimizing the impact to the existing Service Based Management Architecture (SBMA) of 5G OAM system.

The present disclosure includes descriptions of a number of practical applications that provide benefits and/or solve problems associated with orchestrating network functions using a variety of possible infrastructures that may or may not comply with 3GPP (or other telecommunication) standards. By way of example and not limitation, some of these features and corresponding benefits will be discussed in connection with example implementations of a cloud native management system in connection with a variety of different environments.

As a first example, the cloud native management system provides a translation service in which requests that are received via a first API can be translated to a platform-specific (e.g., infrastructure solution-specific) API. Currently, many standards are not always optimized for management of network functions and specifically for cloud-native virtual network functions. For instance, where many standards-based approaches would use an ETSI NFV MANO framework as the standard for describing and orchestrating management of network functions, these existing frameworks often include a lot of overhead and processing inefficiencies due to outdated legacy technologies and out of date frameworks that are not current or optimized for certain management approaches. For instance, many of these conventional frameworks do not support declarative APIs, which can be beneficial for managing a significant number of network functions across multiple deployment areas. In addition, these conventional standards can become burdensome when maintaining state data for a large quantity of network functions. By introducing a standardized API and a translation service in accordance with one or more embodiments herein, the systems described herein open the door for consumers to access functionality of a variety of infrastructure solutions that may be associated with different APIs that are optimized for different services and/or functions that are provided by the respective solutions.

In addition to providing a standardized API that opens the door to access a variety of solutions, features and functionality of the cloud native management system provide a scalable solution to an expanding number of platforms that become available over time. For example, optimized solutions are not always or even typically 3GPP (or other standards) compliant. Indeed, to use services of a first infrastructure, a consumer would need to request those services via an API specific to the first infrastructure. Similarly, to use services of a second infrastructure, the consumer would need to request different (or similar) services using a second infrastructure API. As more infrastructure solutions become available, this creates a significant scalability problem. In addition, where a consumer needs to stay compliant with a certain set of standards, this may limit the consumer to a specific API, making it impossible or impractical to use more optimized or capable functions of specific infrastructure solutions. As mentioned above, by providing one or more APIs that are compliant with certain standards, and then providing a mechanism to translate requests received via the provided API(s), the cloud native management system provides a mechanism whereby a consumer can access non-standards-compliant solutions while remaining compliant with certain telecommunications standards.

As illustrated in the foregoing discussion, the present disclosure utilizes a variety of terms to describe features and advantages of the systems herein. Additional detail is now provided regarding the meaning of some example terms.

For example, European Telecommunications Standards Institute (ETSI) Network Functions Virtualization (NFV) Management and Orchestration (MANO) (or simply, “ETSI NFV MANO”) is an ETSI standard that describes the management and orchestration framework required for provisioning VNFs, and the related operations. “CNSM” (or CNSM producer, or CNSM proxy) is a cloud native management system that facilitates standardized communication between a telecommunication core network (or RAN) and various cloud infrastructure management systems that provide services to authorized users. For example, a CNSM may provide one or more 3GPP defined APIs for a consumer to use. A CNSM may also serve as an MnS producer exposing management services provided by cloud infrastructure management systems (CIMS). A CNSM may refer to a physical hardware or software-based solution that resides on the telecommunication core network, on the cloud infrastructure side, or it may be a standalone proxy between the two.

"A consumer" (or MnS consumer) may refer to any authorized consumer that is allowed to request services from a service provider on the cloud native management system. For example, a telecommunication network operator may authorize consumer (such as devices in that particular operator's network) to access the telecommunication network operators management services. These authorized consumers are often other management functions within the core network of the telecommunication network, that are authorized to use the services. In one or more embodiments, a consumer refers to a function or entity that is tasked with provisioning network functions. In one or more embodiments, the consumer refers to a function or entity that is tasked with managing lifecycle management (LCM) characteristics of a network function. The consumer may refer to any entity that utilizes services provided by another entity in a telecommunications network and may be referred to herein as an operator associating with managing network functions of the network.

In one or more embodiments described herein, a telecommunications network environment may refer to a standardized telecommunication network. The telecommunications network environment may include a radio access network, core network, cloud infrastructure, and any other regions of collections of components that enable consumers to utilize various services of a cloud infrastructure. One or more embodiments described herein refer specifically to a 5G or other 3GPP communication environment. Nevertheless, features described herein in connection with consumer entities, cloud native management entities, and cloud infrastructure management systems may be applicable across a wide variety of communication environments, including future generations (e.g., 6G) of telecommunications network standards, and are not necessarily limited to the specific 5G or other 3GPP standard environments discussed in connection with specific examples herein.

FIG. 1 illustrates an example telecommunication network environment 100 including components of a cloud native management system and a cloud infrastructure management system. For example, the telecommunication network environment 100 includes an authorized consumer 102, a server device(s) 108 and a cloud native management system 104 implemented on the server device(s) 108. The server device(s) 108 may include multiple computing devices.

As further shown, the environment 100 may include a first set of API(s) 110 between the consumer(s) 102 and the cloud native management system 104. In one or more embodiments, the API(s) refer to one or more 3GPP defined APIs that facilitate communication between the consumer 102 and the cloud native management system 104. As further shown, the environment 100 may include a cloud infrastructure management system (CIMS) 106 (Or simply "CIMS 106") in communication with the cloud native management system 104 via one of a variety of communication mechanisms. For example, the CIMS 106 may communicate with the cloud native management system 104 via a second set of API(s) 112. The second API(s) 112 may be de-facto standard API(s) supported by the cloud infrastructure management system (CIMS), proprietary API(s) supported by the CIMS deployment, and/or other standard API(s) defined by ORAN or ETSI or other standardization body supported by the CIMS 106.

As further shown, FIG. 1 depicts the cloud native management system 104 as a producer in relation to telecommunication network management system consumers 102 (or simply "consumers") and the CIMS 106. As will be discussed in further detail herein, the role of the cloud native management system 104 can be viewed as a proxy, translating the 3GPP defined APIs 110 to the APIs 112 understood by the cloud infrastructure management system among other functionalities. In some implementations, some or all of the functionality of the cloud native management system 104 is implemented as part of the consumer(s) 102 rather than as a stand-alone service, as shown in FIG. 1.

As further shown in FIG. 1, the cloud native management system 104 includes a number of components. For example, the cloud native management system 104 includes an API manager 114, request manager 116, and translation manager 118. The cloud native management system 104 additionally includes a data storage 120 having lifecycle management (LCM) data 122 and configuration management (CM) data 124 thereon. As shown in FIG. 1, each of the components of the cloud native management system 104 may be implemented on the server device(s) 108 positioned between the consumer(s) and the CIMS 106. In one or more embodiments, one or more components of the cloud native management system 104 are implemented on one or more CIMS. For instance, a CIMS implementer (not shown) may be implemented on the CNSM 104 and expose the various services to the consumer 102. In one or more implementations, one or more of the components of the cloud native management system 104 are implemented on the consumer(s) 102.

As just mentioned, the cloud native management system 104 may include an API manager 114. The API manager 114 may provide features and functionality associated with obtaining information associated with any number of APIs and infrastructure solutions. For example, the API manager 114 may obtain information about which infrastructure solutions are associated with respective APIs (e.g., API(s) 112). The API manager 114 may collect or otherwise obtain mapping information associated with features and functionality of different commands or packets that may be communicated via the respective APIs for use in maintaining a mapping or database of rules and policies that may be used in translating requests that are delivered via a first API 110 and translated to a second API 112.

As further shown, the cloud native management system 104 includes a request manager 116. The request manager 116 may facilitate receipt and processing of one or more requests or other data packages received from a consumer 102. For example, the request manager 116 may receive a request via the first API 110 and determine or otherwise identify characteristics or attributes associated with the request based on information contained within the request. In one or more embodiments, the request includes one or more attributes that may be used in determining one or more applicable infrastructure solutions that may be applicable to a given request. Additional detail associated with receiving and processing a request, as well determining a relevant infrastructure solutions will be discussed below in connection with FIG. 4.

As further shown, the cloud native management system 104 includes a translation manager 118. The translation manager 118 facilitates translation of a request, command package, or any other signal(s) received via the first API to a request that can be sent or otherwise communicated to a target infrastructure (e.g., the CIMS 106) via a second API 112. As will be discussed below, the translation manager 118 may translate the request based on a mapping of rules between different APIs 110, 112. For example, after determining a target infrastructure solution (e.g., the CIMS 106) based on attributes contained or determined for a received request, the translation manager 118 may translate the request received via the first API 110 to a request transmittable over the second API 112 associated with the target infrastructure solution. Additional information associated with translating requests will be discussed below in connection with FIGS. 4-8.

As shown in FIG. 1, the cloud native management system 104 includes a data storage 120 having a variety of data maintained or otherwise accessible to the server device(s) 108. In this example, the data storage 120 includes LCM data 122 and CM data 124. In one or more embodiments described herein, the cloud native management system 104 receives, processes, and translates requests associated with management of network functions. In many instances, these requests refer to provisioning including lifecycle and configuration of network functions. As used herein, provisioning may refer to lifecycle management and/or configuration management. As will be discussed in further detail below, the cloud native management system 104 may additionally determine different APIs based on whether a request is associated with an LCM function or a configuration management function (CM function) of the network function associated with the request. Indeed, information associated with various example requests as well as identifying infrastructure solutions and translating the requests based on the infrastructure solution(s) will be discussed in connection with both LCM and CM requests in connection with FIGS. 5-8 below.

Figure 2:
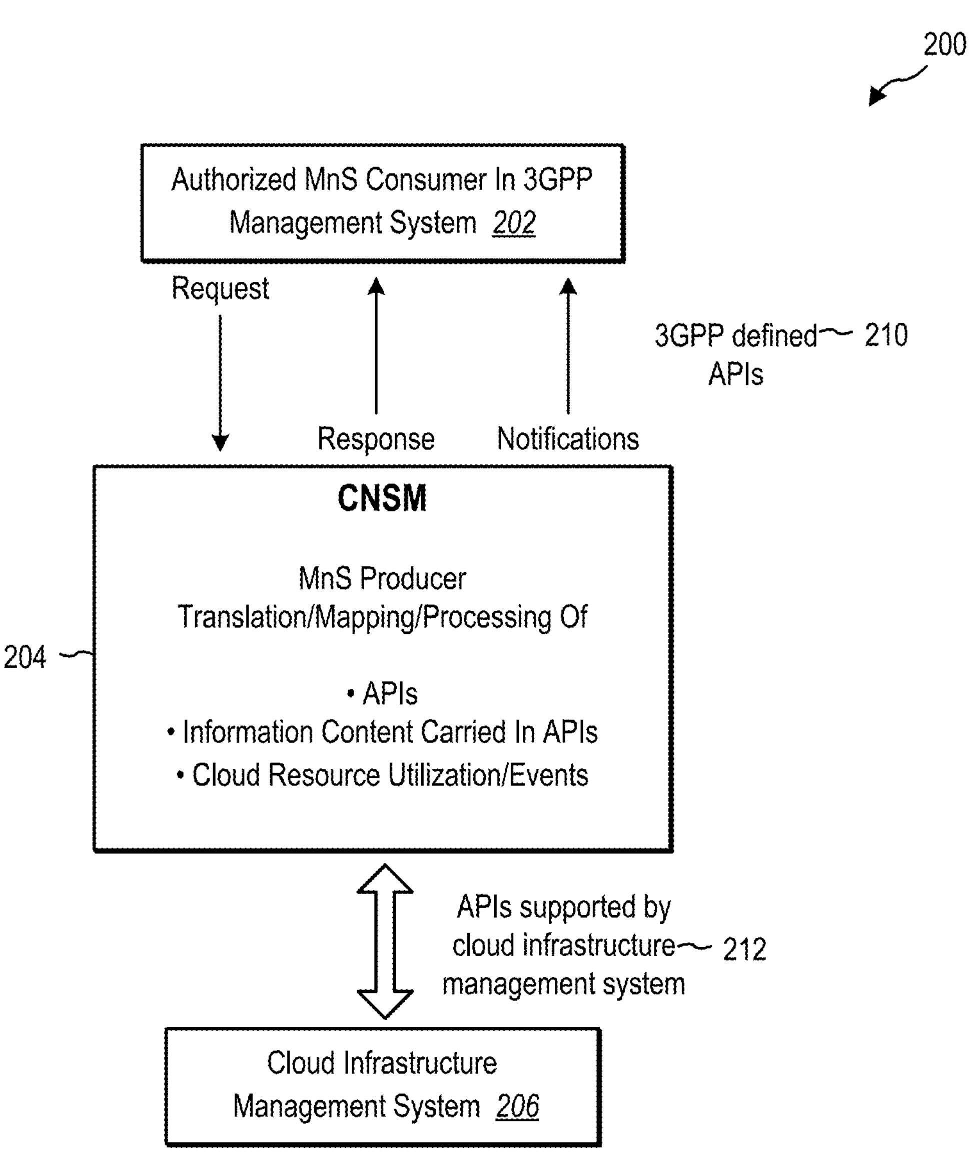
FIG. 2 illustrates another example environment including a cloud native management system implemented on a telecommunications network environment in accordance with one or more embodiments.

FIG. 2 illustrates another example of a telecommunication network environment 200 including many of the same components and features as discussed above in connection with the telecommunication network environment 100 illustrated in FIG. 1. For example, as shown in FIG. 2, an example environment 200 (e.g., a 3GPP telecommunication network environment) may include a telecommunication network management system including an authorized consumer 202 in the telecommunication network management system. As further shown, the example environment 200 may include a CNSM producer 204 (or simply, "CNSM 204") in communication with the authorized consumer 202 via 3GPP defined API(s) 210. The CNSM 204 may refer to one implementation of the cloud native management system 104 discussed above and in connection with other implementations described herein.

As shown in FIG. 2, and as will be discussed in further detail in connection with examples below, the authorized consumer 202 and the CNSM 204 may transmit various communications to and from one another. For example, the authorized consumer may provide a request for one or more actions related to deployment of one or more network functions, or for provisioning actions to be taken on already deployed network functions. The CNSM 204 may provide a response to the request including a variety of information related to the request. Further, the CNSM 204 may provide notifications including additional information provided in conjunction with the response and/or subsequent to processing the response. Additional information in connection with examples of these communications will be discussed below.

As shown in FIG. 2, and as will be discussed in further detail below, the CNSM 204 may provide a variety of features and functionality in connection with facilitating management of CNFs for the authorized consumer 202 and on the CIMS 206. For example, the CNSM 204 may facilitate translation, mapping, and processing of requests via APIs, information content carried in the APIs, and/or cloud-resource utilization/events. As further shown, the CNSM 204 can communicate with the CIMS 206 via one or more APIs 212 supported by the CIMS 206, which may include a variety of API-types as previously discussed in connection with FIG. 1.

Additional detail will now be discussed in connection with features and functionality of the CNSM 204. In one or more embodiments, the CNSM 204 translates 3GPP APIs 210 to cloud infrastructure supported APIs 212. For example, when a communication comes in to the CNSM 204 through one of the 3GPP APIs 210, the CNSM 204 will detect what is in that particular deployment and will translate the request for a CIMS supported API 212.

For example, in one or more implementations, the CNSM 204 interacts with authorized consumer 202 of its services via 3GPP defined service-based interface 210. In addition, in one or more implementations, the CNSM 204 interacts with the cloud infrastructure management system 206 using one of a variety of APIs 212 (as supported by the CIMS).

For instance, in one or more embodiments, the CNSM 204 interacts with the CIMS 206 via a de-facto standard APIs supported by the cloud infrastructure management system. In contrast, the CNSM 204 may interact with the CIMS 206 via proprietary APIs (e.g., infrastructure solution-specific APIs) supported by the cloud infrastructure management system deployment. In one or more embodiments, the CNSM 204 interacts with the CIMS 206 via standard APIs defined by ORAN or ETSI or other standardization bodies if supported by the cloud infrastructure management system. In one or more embodiments, the CNSM 204 interacts with the CIMS 206 using a variety of different APIs 212 of the above-mentioned types and standards. It will be noted that the CNSM 204 may already have an established relationship or connection with the CIMS 206 and have negotiated the supported APIs and capabilities prior to carrying out one or more of the acts described herein.

In one or more embodiments, the CNSM 204 maps the information available within telecommunication network management system to the information processable by the cloud infrastructure management and vice versa. This information may be used in either 3GPP or de-facto standard APIs and might not necessarily be understandable or ready to process as-is by the other side. In one or more embodiments, the translation of APIs and mapping of the information is not enough and the CNSM 204 will partially process the APIs or otherwise maintain the required mapping information. Some scenarios where mapping and the additional processing of the information by the CNSM 204 will be discussed in further detail below.

For example, API 210 (e.g., the 3GPP defined APIs) may carry sets of attributes that the API 212 (e.g., the CIMS-supported APIs) does not have, or where the respective APIs 210, 212 have different formats or variations of the data. These differences in the attributes and/or formats will cause the CNSM 204 to perform information mapping for the purpose of translating requests received via one API to be provided via the other API. The information mapping may include, for example, pulling additional data from another server or from the CIMS 206, in order to insert correct information to the set of attributes for the API 212 to understand (e.g., to map information).

In one or more embodiments, the CNSM 204 further translates cloud resource utilization information into 3GPP event instances (or notification triggers). In one or more embodiments, the CNSM 204 has a function associated with the cloud resources (CPU, storage, etc.) utilization. In particular, the CNSM 204 may be responsible for translating events generated by the cloud infrastructure into 3GPP events/data, performance measurements, and fault/alarm/logs. These translated events can be used and made available to data analytics services and other services. For example, a cloud resource may report a 30% CPU usage to the CNSM 204, and the CNSM 204 will translate that resource utilization information into a 3GPP event that the core network (e.g., the consumer) will understand (e.g., high network congestion) based on attributes specific to the corresponding API(s).

In one or more embodiments, the CNSM may perform one or more of the API translation, mapping of information, and translating cloud resource utilization information into 3GPP event instances. In one or more embodiments, this process of translating, mapping, and processing into 3GPP events is based on a received request associated with managing a network function instance.

Figure 3:
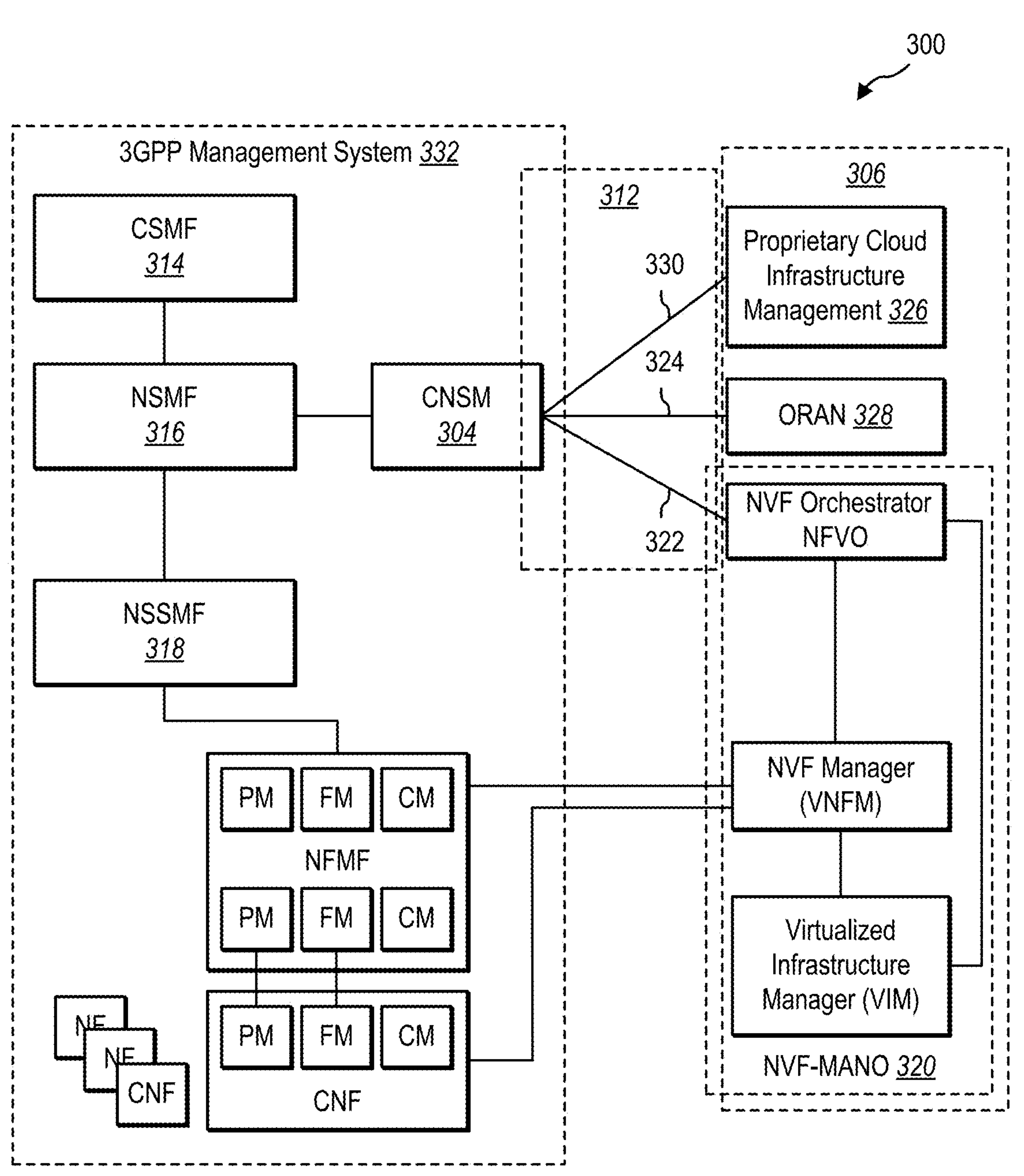
FIG. 3 illustrates a more detailed example environment including a cloud native management system implemented on a core network in accordance with one or more embodiments.

Turning now to FIG. 3, this figure illustrates an example environment 300 showing additional components and features of the telecommunication network management system and cloud infrastructure. As will be discussed in further detail below, various entities shown in FIG. 3 may be specific examples and share features and functionalities of the consumer, CIMS, and CNSM entities discussed above in connection with FIGS. 1-2. Accordingly, one or more features described in connection with the various entities of FIG. 3 may similarly apply to the corresponding components discussed above in connection with FIGS. 1-2 (and vice versa).

3GPP SA5 has recognized the need for automation of management by introducing new management functions such as a communication service management function (CSMF) 314, network slice management function (NSMF) 316, and a network slice subnet management function (NSSMF) 318 to provide an appropriate abstraction level for automation.

The 3GPP SA5 management architecture has adopted a service-oriented management architecture which is described as interaction between consumer (e.g. a management service consumer) and management service provider. For example, a consumer can request operations from management service providers on fault supervision service, performance management service, provisioning service and notification service, etc.

FIG. 3 shows an example CNSM producer 304 (or simply "CNSM 304") in a telecommunication network management system 332 (e.g., a core network) where the consumer of its services is Network Slice Subnet Management Function (NSSMF) 318. In one or more embodiments, the consumer (or an additional consumer) is a Network Slice Management Function (NSMF) 316. Indeed, as shown in FIG. 3, the telecommunication environment may include any number of consumer entities in communication with the CNSM 304. As will be discussed below, one or more instances of the CNSM 304 may be deployed on the respective consumer entities.

In one or more embodiments, the CNSM 304 can be deployed as a management function, or as a service within any other management function. In the illustrated example, the CNSM 304 may refer to a standalone management function interacting with either ETSI NFV MANO 320 via Os-Ma-nfvo interface 322, ORAN 328 (Open Radio Access Network) via interface 324 (e.g., ORAN defined interface), or a proprietary cloud infrastructure management system (PCIMS) 326 via proprietary APIs 330. In one or more embodiments, the CNSM 304 can be deployed as a service producer co-located within the NSSMF 318. In one or more embodiments, the CNSM 304 can be implemented as a functionality within cloud infrastructure management system 306. In one or more embodiments, the CNSM 304 can be implemented as a standalone functionality between the telecommunication network management system (e.g., core network) and cloud infrastructure management system.

In one or more embodiments, there may be a separate CNSMs 304 for each of the three management systems (e.g., for PCIMS 326, ORAN 328, and NFV-MANO 320). For example, a first CNSM may be configured to communicate with the PCIMS 326, a second CNSM may be configured to communicate with the ORAN 328, and a third CNSM may be configured to communicate with the ETSI NFV MANO 320. In some embodiments, as shown in FIG. 3, a single CNSM may be configured to communicate with all three systems.

In one or more embodiments, as shown in FIG. 3, there may be only one communication channel 310 (e.g., 3GPP defined API) from the telecommunication network management system 332 to the CNSM 304. For example, all communication to and from the CNSM 304 may travel through the NSSMF 318. In one or more embodiments, there may be several communication channels from the telecommunication network management system 332 to the CNSM 304. For example, there may be first communication channel between the CNSM 304 and the NSSMF 318, and a second communication channel between the CNSM 304 and the NSMF 316.

Additional information will be discussed in connection with a number of example implementations of the CNSM 104 and associated features. These examples are provided by way of example and not limitation. For example, features described in connection with specific examples may be implemented in other examples associated with implementation of one or more embodiments described herein. Indeed, any of the below features in connection with the different example use-cases may be performed in combination with the other example implementations and/or use-cases. In other words, the features and functionality described in connection with specific examples and use-cases may be applicable to one or across multiple implementations of the CNSM 104.

As a first example related to inquiry about CNF packages, an authorized consumer (e.g., consumer 102) of the CNSM 104 (e.g., a NF provisioning management service producer which as an example can be a role taken by NSSMF) may inquire availability and/or status of CNF packages in the infrastructure management system. In this example, the CNSM 104 may receive a request for either one time information or subscription for notifications related to CNF packages of one, or multiple NFs. There may be different types of software packages for an NF with different capabilities. The CNSM 104 may maintain a library of the information about different available packages and their capabilities and status (onboarded, active, etc.) or, as a result of receiving the request from an authorized consumer in 3GPP management system, may interact with the cloud infrastructure management system (CIMS) 106 to collect that information. The CNSM 104 may then provide that information as a response to the request from authorized consumer (or may provide the information as it becomes available if the authorized consumer is subscribed for notifications).

As a second example related to inquiry about available deployment sites, an authorized consumer in the 3GPP management system (for example NF provisioning management service producer) may inquire about the available deployment sites and their characteristics matching specific criteria. This request for information may be sent to the CNSM 104. Upon receiving this information, the CNSM 104 may perform one of a variety of responses.

For example, in one or more embodiments, the CNSM 104 may inquire the cloud infrastructure management system (CIMS) 106 directly (by translating the received API to an API supported by CIMS), such as when the CIMS 106 is capable of providing the information based on the information provided in the original inquiry. As another example, the CNSM 104 may map the provided information, in this case the tracking area, to information that is processable by CIMS 106, for example the geographical area before sending the API (e.g., API(s) 112) as supported by CIMS 106. As another example, the CNSM 104 may already have the information available based on the capability of maintaining the library of the available sites and their characteristics and status. In each of the above-cases, the CNSM 104 may respond back to the authorized consumer with the information about the available deployment sites and their characteristics and status using APIs to be defined by 3GPP.

As a third example related to instantiation of a CNF, in one or more embodiments, the authorized consumer in a 3GPP management system (for example NF provisioning management service producer) may request installation of a CNF. This request may include the deployment site and/or the specific package to be used for instantiation or may include neither. If one or both of these examples, where pieces of information are not available, upon receipt of the request, the CNSM 104 may perform a variety of functions based on the CIMS policy and capability.

For example, in one or more embodiments, the CNSM 104 may pass on the request to CIMS 106 (using APIs (e.g., API(s) 112) supported by CIMS) and allow CIMS 106 to make the decision about either the deployment site or the flavor of the package to be used or both. As another example, based on the requirements of the NF (required resources and capabilities, etc.) and the characteristics and location of deployment sites and the capabilities of the available packages, the CNSM 104 may decide the best deployment site and/or the package for instantiation of the NF and then request instantiation of the NF from CIMS 106 using the decided parameters. The CNSM 104 may receive the result of instantiation from CIMS 106 using the APIs (e.g., API(s) 112) supported by CIMS 106 and then provide that information to the authorized 3GPP consumer using 3GPP defined APIs (e.g., API(s) 110).

As a fourth example related to configuration and modification (e.g., scaling and descaling) of a CNF, in one or more embodiments, the authorized consumer in 3GPP management system (for example NF provisioning management service producer) may request configuration of a CNF with specific attributes/parameters. In this scenario, the CNSM 104 may receive these attributes and maps the changes to APIs supported by the CIMS 106 and transmits them to CIMS 106. After receiving the response APIs, the CNSM 104 may notify the authorized consumer of the result.

Where the CNSM 104 receives request for modification of a CNF, it may have to evaluate whether the modification requires scaling/descaling of the CNF. If it does, then it will invoke the supported APIs for scaling/descaling to CIMS 106 and receive confirmation of the request and its results. The CNSM 104 may then send the result to the authorized consumer of its service.

In one or more embodiments, the CNSM 104 may simply communicate the modification request to the CIMS 106 using APIs supported by the CIMS and let the CIMS 106 decide on scaling/descaling required. In one or more embodiments, the CNSM 104 may receive specific scaling/descaling request for 3GPP authorized consumer, in which case it will need to transmit the scaling/descaling request to CIMS 106 using APIS supported by CIMS 104.

As a fifth example related to termination or deletion of CNFs, an authorized consumer in 3GPP management system (for example NF provisioning management service producer) may request termination of a specific CNF instance. In this scenario, the CNSM 104 may receive the termination request and communicates that with CIMS 106 using the APIs supported by CIMS 106. After receiving the success result for the operation, the CNSM 104 may delete any related information to that CNF and notify the authorized consumer of the result.

As a sixth example related to performance metrics, the CNSM 104 may translate performance metrics associated with cloud resource utilization into 3GPP defined metrics for authorized consumers.

As a seventh example related to processing faults and alarms, the CNSM 104 may map faults and alarms generated by the cloud infrastructure to 3GPP events and notifications. The CNSM 104 may then provide data associated with the events/notifications to an authorized consumer (e.g., the Management Data Analytics Function (MDAF)).

The features and functionalities described herein provide a number of advantages and benefits over conventional approaches and systems. For example, features of one or more embodiments described herein provide a solution based on SBMA that builds on existing solutions in 3GPP. As another example, features of one or more embodiments described herein support a variety of cloud-native management solutions and enables seamless integration of them with 3GPP management systems. As a further example, features of one or more embodiments described herein do not rely on ETSI NFV MANO standards which is often heavy with high-overhead and has gaps when it comes to management of cloud native NFs as opposed to VNFs. As a yet another example, instead of having to use various different ETSI or cloud infrastructure-based APIs, the CNSM provides a single standardized API that authorized consumers can use to communicate with the CIMS.

Figure 4:
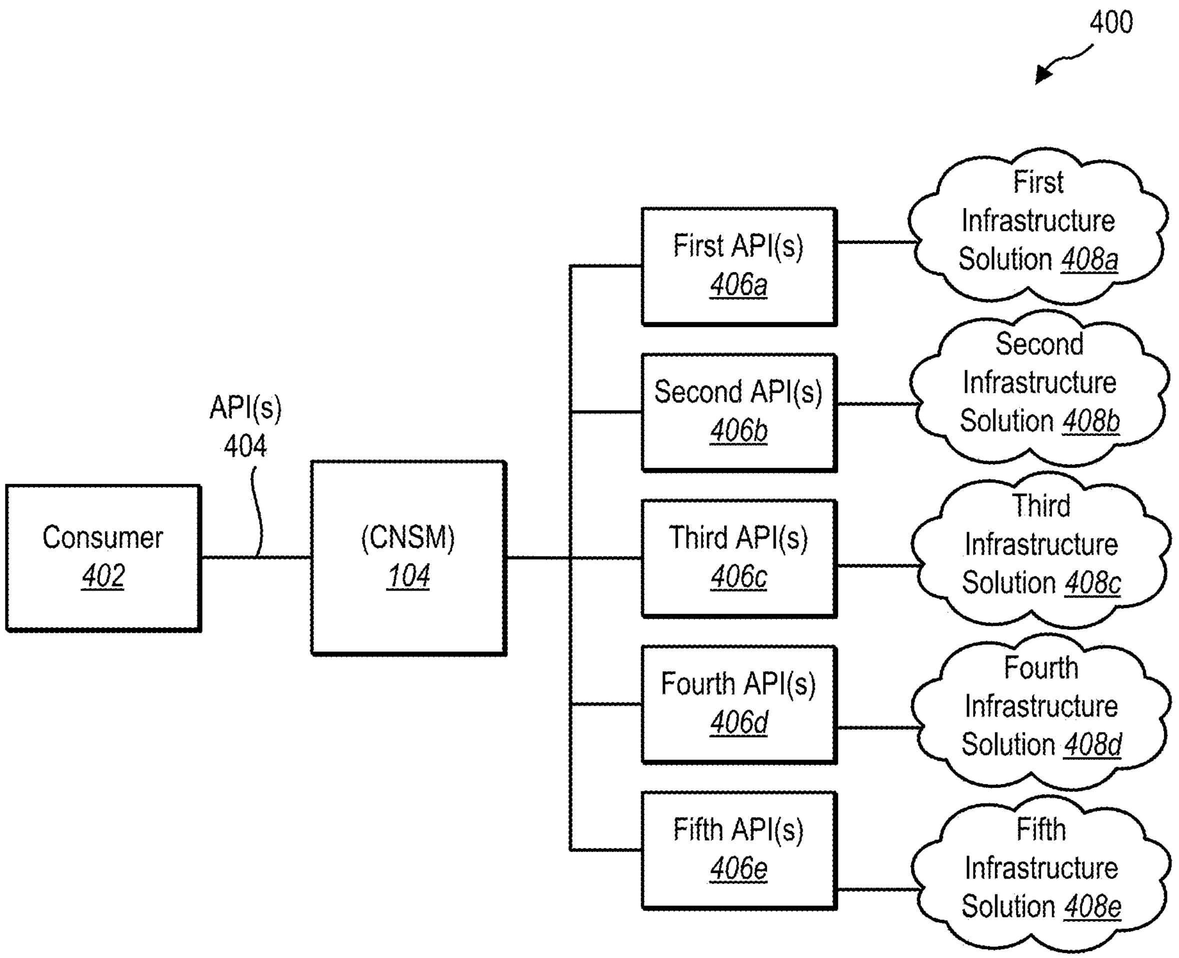
FIG. 4 illustrates an example environment including a cloud native management system implemented in connection with a plurality of solutions and associated platforms in accordance with one or more embodiments.

Turning now to FIG. 4, this figure illustrates an example environment within which the cloud native management system 104 (e.g., a CNSM) may be implemented in accordance with one or more embodiments. As shown in FIG. 4, a consumer 402 interfaces with the cloud native management system 104 via a first API 404. As further shown, the cloud native management system 104 may invoke any number of supported infrastructure solutions 408*a-e* (e.g., CIMSs) that are supported by the cloud native management system 104. (e.g., for which functions or capabilities of the corresponding solutions have been previous established or otherwise negotiated by the cloud native management system 104).

The infrastructure solutions 408*a-e* and associated APIs 406*a-e* may refer to any number or variety of solutions/APIs that are supported by the cloud native management system 104. In one or more embodiments, the respective infrastructure solutions 408*a-e* refer to specific proprietary solutions or platforms that provide features and functionality associated with network functions that may be instantiated and managed on a telecommunications network (e.g., a 5G telecommunications network or other generations of telecommunications networks).

As a non-limiting example, the first infrastructure solution 408*a* may refer to a first proprietary solution(s), such as Azure Nexus while the first API(s) 406*a* may refer to Azure resource manager (ARM) APIs and/or Nexus-specific APIs. In this example, the second infrastructure solution 408*b* may refer to a second proprietary solution(s), such as open radio access network (O-RAN) cloud (O-Cloud) while the second API(s) 406*b* may refer to an O-RAN alliance-2 (O2) API or other interface component of O-RAN architecture. In this example, the cloud native management system 104 and/or second API(s) 406*b* may incorporate a service management and orchestration (SMO) service orchestrator that facilitates communication of requests between the cloud native management system 104 and O-Cloud solution.

As further shown, in this example, the third infrastructure solution 408*c* may refer to a third proprietary solution, such as a MANO managed solution while the third API(s) 408*c* refer to MANO APIs or APIs otherwise supported by ESTI MANO NFVO APIs. As further shown, In this example, the fourth infrastructure solution 408*d* may refer to a fourth proprietary solution, such as a Nephio managed (or other open-source) solution in which the fourth APIs 406*d* refer to open APIs and/or Kubernetes (K8) APIs with a Nephio orchestrator component. As further shown, in this example, the fifth infrastructure solution 408*e* may refer to a fifth proprietary solution, such as an Amazon Web Service (AWS) solution in which the fifth APIs 406*e* refer to AWS-supported APIs. It will be noted that one or more embodiments may include some or all of these solutions and associated APIs. It will also be appreciated that other implementations may include fewer or additional solutions and associated APIs.

While not shown in FIG. 4, some or all of these APIs may be associated with a respective translator implemented within the cloud native management system 104. For instance, in the example above, the first, third, and fifth APIs (406*a*, 406*c*, 406*e*) may be associated with respective translators while the ETSI MANO NFVO and/or open source solutions (e.g., second and fourth APIs 406*b*, 406*d*) may not necessarily require translation to remain compliant with one or more telecommunication standards.

Figure 5:
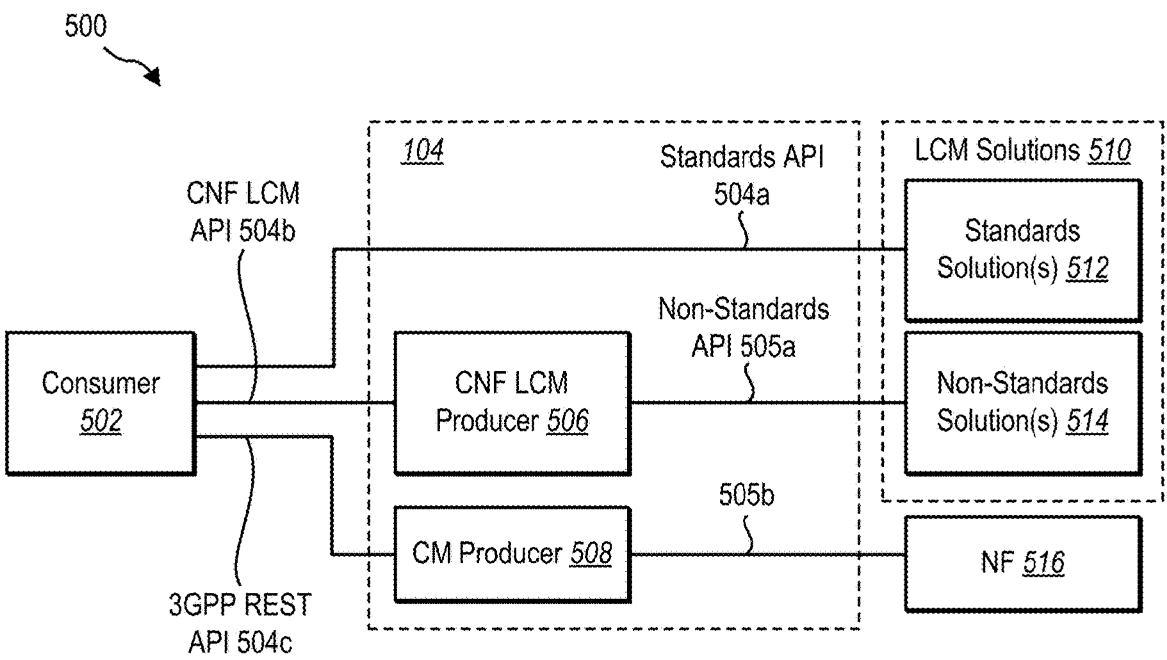
FIG. 5 illustrates an example implementation of the cloud native management system for managing select lifecycle management (LCM) services in accordance with one or more embodiments.

Additional detail will now be discussed in connection with different architecture implementations of the cloud native management system 104. For example, FIG. 5 illustrates a first architectural environment 500 in which the cloud native management system 104 facilitates receiving a request from a consumer 502 and selectively translating the request based on a target infrastructure solution 510 associated with the request. In this example, LCM and CM functions 506, 508 may invoke different paths between the consumer 502 and corresponding solution(s) 510, 516.

In this example, the cloud native management system 104 uses different sets of APIs 505*a*, 505*b* based on the LCM or CM nature of a request as well as an identified infrastructure solution 514, 516 associated with the request. In conventional 3GPP management systems, there are often different sets of APIs used for LCM of network functions and other provisioning functions (e.g., configuration management (CM), performance management (PM), and fault management (FM)) of network functions regardless of whether they are containerized network functions, virtualized network functions, or physical network functions.

In maintaining the same paradigm design, the cloud native management system 104 offers a variety of solutions, which may differ on whether NFV MANO services are also exposed via the cloud native management system 104 or not. It will be noted that there are existing standards-defined APIs 504*a* defined by ETSI to consume NFV MANO services, but which are the only APIs that conventional 3GPP management systems allow for LCM of network functions.

In the example shown in FIG. 5, the cloud native management system 104 provides LCM services for cloud-native functions (or simply network functions) via a new API 505*a* for network functions that are orchestrated or managed by CIMS solutions 514 that have no specified standardized APIs available for existing standardized APIs by ETSI. In this example, the cloud native management system 104 provides provisioning services via an already specified standard API (e.g., a 3GPP REST API) via a CM producer (or provisioning producer). Where the request involves LCM of a network function, the cloud native management system 104 determines whether the solution pertains to a standard solution 512 (e.g., ETSI NFV MANO) or to a non-standard solution 514 (e.g., any other CIMS that is not the ETSI NFV MANO solution).

Figure 6:
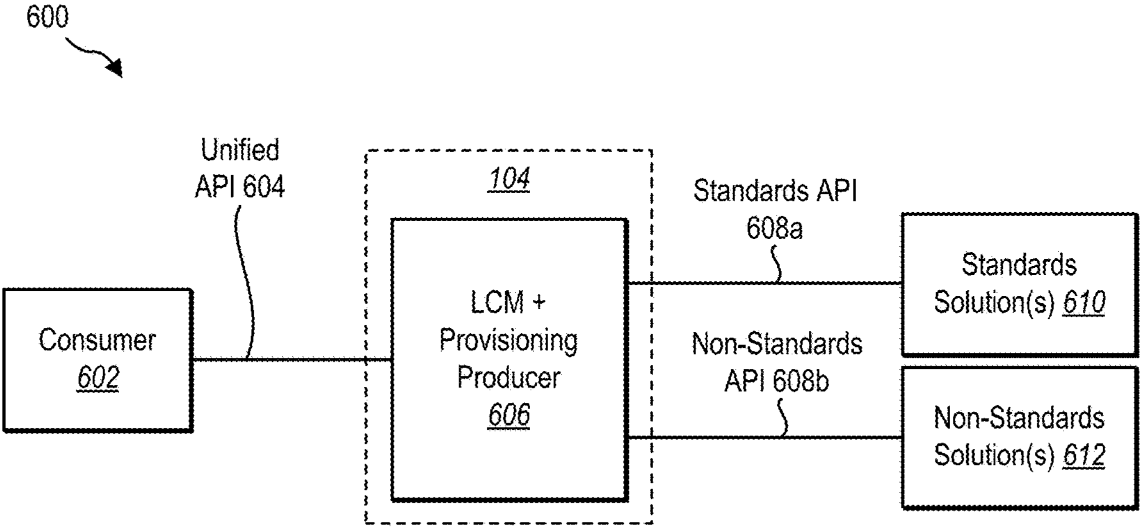
FIG. 6 illustrates an example implementation of the cloud native management system for implementing a unified application programming interface (API) in association with managing CM and LCM services in accordance with one or more embodiments.

Thus, in the above-example, the cloud native management system 104 may first determine if an LCM-related request is associated with a non-standard solution 514 (e.g., a non-ETSI NFV MANO solution). Based on this determination, utilize the CNF LCM API as the first API 505*a* and the non-standards API as the second API 504*a*. Stated differently, the cloud native management system 104 (or consumer) may determine whether the LCM request involves an ETSI NFV MANO solution. If it does, then the consumer may simply use this standard solution (as the request would already be in a format recognized by the standard-associated solution). If the request is an LCM related request that does not involve the ETSI NFV MANO solution, the cloud native management system 104 may identify the target non-standard solution and cause the request to be translated and invoke the appropriate proprietary solution via corresponding API.

Where FIG. 5 illustrates an example in which the cloud native management system 104 selectively invokes specific infrastructure solutions for only LCM-related requests, FIG. 6 illustrates an example architecture 600 in which the cloud native management system 104 uses a unified API 604 for processing requests associated with both LCM and other provisioning related requests (e.g., CM). In this example, the cloud native management system 104 includes an LCM and other provisioning functions (e.g., CM) producer 606 equipped to handle both LCM and CM requests received via a unified API 604. As shown in FIG. 6, where the identified infrastructure solution is a standards solution 610, the request is translated to a standards API 608*a* (e.g., a standards-defined API). Conversely, where the identified infrastructure solution is a non-standards solution 612, the request is translated to a non-standards API 608*b* (e.g., a non-standards-defined API).

In this example shown in FIG. 6, the LCM and provisioning producer 606 is capable of providing the services for cloud-native network functions regardless of whether the network functions are orchestrated or managed by ETSI NFV MANO or other non-standards solutions. Thus, the cloud native management system 104 exposes all services (both standard and non-standard) via a unified set of APIs 604.

While not shown in FIG. 6, in one or more embodiments, the cloud native management system 104 uses a unified API 604 for both LCM and other provisioning requests (e.g., CM) for only the non-standards solutions 612. In this example, similar to the example discussed above in connection with FIG. 5, the cloud native management system 104 receives and translates any request (e.g., LCM and CM requests) where it is determined that the infrastructure solution is a non-standard solution. Otherwise, the consumer 602 may bypass the cloud native management system 104 and simply use the standards API 608*a* (e.g., the ETSI NEV MANO solution for LCM requests, the 3GPP REST API for CM requests, and/or the CNF LCM API specified (or to be specified) in 3GPP).

Figure 7:
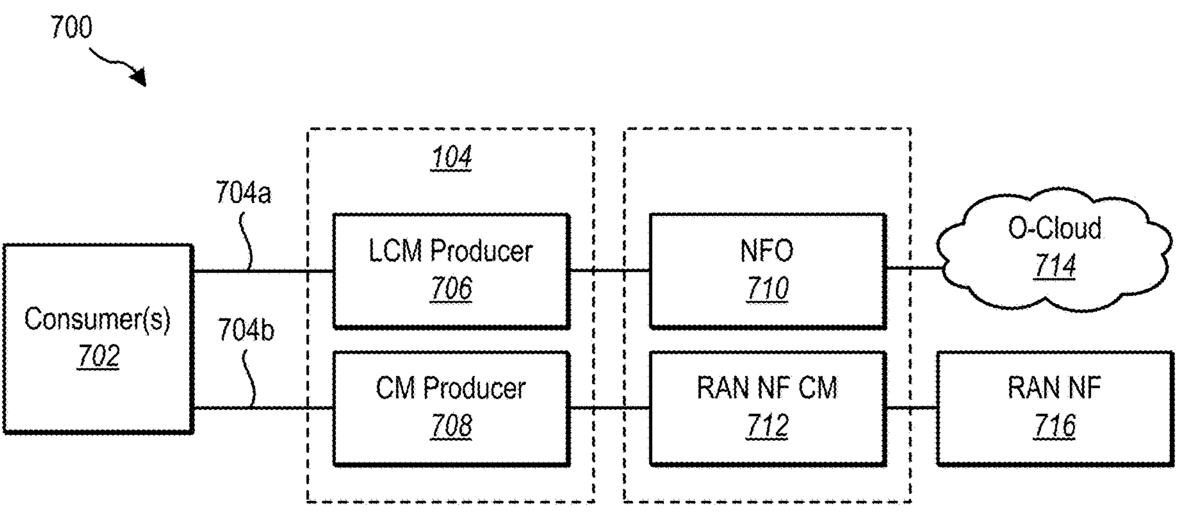
FIG. 7 illustrates an example implementation of the cloud native management system for managing open radio access network (O-RAN) services in accordance with one or more embodiments.
Figure 8:
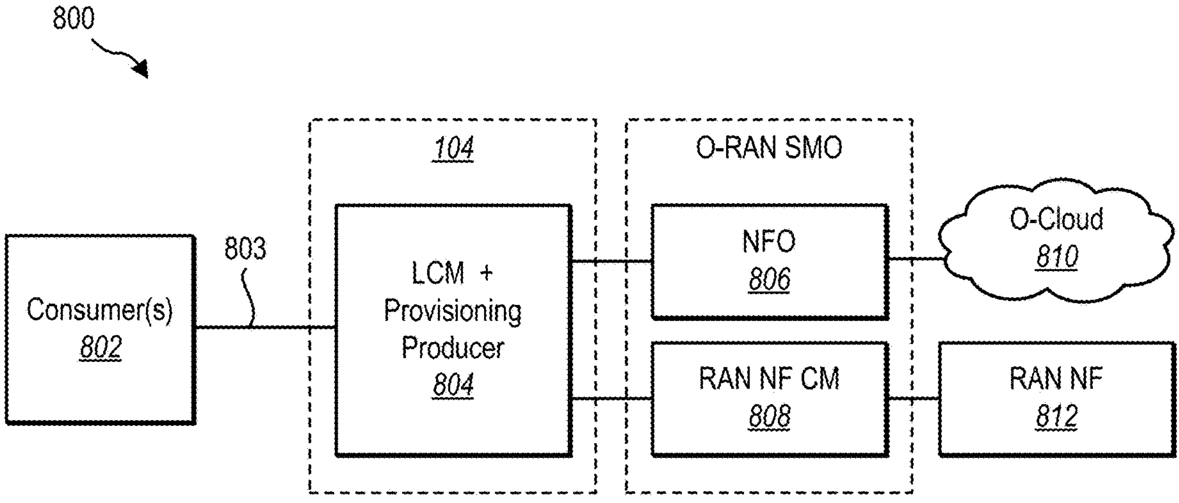
FIG. 8 illustrates another example implementation of the cloud native management system for managing O-RAN services in accordance with one or more embodiments.

Moving on, FIGS. 7-8 illustrate example environments associated with exposing services provided by O-RAN (e.g., an O-RAN infrastructure solution). Indeed, O-RAN is in the process of specifying APIs to expose services provided by O-RAN SMO, specifically, services provided by NFO and RAN NF CM. These services can be consumed by 3GPP management system for LCM and CM of RAN NFs deployed in O-Cloud. Specifically these services can be consumed by 3GPP management system's CNF LCM and Provisioning MnS Producer.

For example, FIG. 7 illustrates an example environment 700 in which the cloud native management system 104 provides an LCM producer 706 and a CM producer 708 (or other provisioning producer) to facilitate exposure of services or network functions for a radio access network (RAN) (e.g., a virtual RAN). In this example, the cloud native management system 104 provides an LCM producer 706 that exposes services of an O-Cloud infrastructure solution 714 via a first set of APIs 704*a* between the cloud native management system 104 and O-RAN APIs between the CNSM 104 and the O-Cloud solution 714. As further shown, the cloud native management system 104 provides a CM producer 708 that exposes services of the RAN network functions (NFs) 716 via a second set of API(s) between the cloud native management system 104 and the RAN network function. As shown in the illustrated example, NFO services 710 are consumed by the cloud native management system 104 and RAN NF CM services 712 are consumed by provisioning the CM (or provisioning) producer (e.g., an NFMF)

FIG. 8 illustrates an example environment 800 similar to the environment discussed in FIG. 7 while using a single set of APIs 803 to communicate the request(s) to the cloud native management system 104. In this example, the cloud native management system 104 provides an LCM and provisioning producer 804 to facilitate exposure of services or network functions for the RAN. In contrast to the example above in which the LCM and CM producers are separately accessed via respective APIs, the LCM and provisioning producer 804 are invoked using a unified API 803 (e.g., similar to FIG. 6) in which requests for both LCM and other provisioning related services can be communicated in a similar manner to the cloud native management system 104.

As noted above, the cloud native management system 104 may communicate translated requests to the respective RAN solutions (e.g. the O-Cloud 810 for LCM requests and the RAN network function (NF) 812 for provisioning requests) using respective sets of APIs. In both examples shown in FIGS. 7-8, the LCM exposure path may include O-RAN APIs between the cloud native management system 104 and the NFO 806 (or another RAN orchestrator) and a combination of ETSI and K8 APIs between the NFO 806 and the O-Cloud solution 810. Further in this example, the provisioning exposure path may include O-RAN APIs between the cloud native management system 104 and RAN NF CM 808 with an O1 API between the RAN NF CM 808 and the RAN NF 812.

Additional detail will now be discussed in connection with APIs, LCM paths, and other provisioning paths (e.g., CM paths), and features of the requests pertaining to several of the above-examples. It will be appreciated that the following features of the APIs, LCM paths, and other provisioning paths (e.g., CM paths), and the requests may be applied to any of the above examples and are not intended to be limited to any single embodiment of the cloud native management system 104.

The APIs may include a variety of features and functionalities in accordance with one or more embodiments. For example, in one or more embodiments, consumer-side APIs support declarative commands and definitions. In one or more embodiments, the consumer-side APIs support immutable actions. In one or more embodiments, the consumer-side APIs support declarative configuration objects. These supported features provide unique optimizations in supporting cloud-native network functions that are not currently supported by exclusive NFV MANO APIs and associated solutions.

As noted above, one or more embodiments of the cloud native management system 104 provides separate paths for receiving, processing, and exposing solutions based on LCM and/or other provisioning solutions. Indeed, one or more examples discussed above involve processing LCM requests using a CNF specific API while allowing other provisioning requests to follow conventional paths in accordance with existing 3GPP standards. In the scenario where the LCM and provisioning services are associated with different paths, the cloud native management system 104 may use a variety of APIs that are defined for respective services. This application proposes various solutions specifically for LCM APIs.

For example, in one or more embodiments, the cloud native management system 104 utilizes Kubernetes APIs to deploy CNF as a workload on Kubernetes clusters. In this solution, the consumer of LCM of CNFs would support Kubernetes APIs. As another example, the cloud native management system 104 uses REST APIs, which may or may not conform to 3GPP new radio measurement (NRM) (or which may partially conform to NRM). Alternative, in one or more embodiments, the cloud native management system 104 uses REST APIs that are defined by other SDOs and which do not conform to NRM.

In some of the above examples, the cloud native management system 104 utilizes a unified set of APIs (e.g., consumer-side APIs) for both LCM and other provisioning services/requests (or only LCM services). In one or more embodiments, the unified set of APIs is an extension of current standards-defined requests, such as provisioning procedures for networks and network slicing, including creating of NF instances, modification of NF instances, and deletion of NF instances.

As a first example request, the cloud native management system 104 provides a unified API capable of handling a create network function request (e.g., a non NFV MANO request). In this example, the create network function request may be similar to the CreateMOI request as defined in 3GPP TS 28.533. In this example, the consumer provides the create network function request to trigger deployment of a network function. The cloud native management system 104 receives the request with network function related requirements. The cloud native management system 104 drives the requirements on the actions needed, including network function package management, instantiation of the network function, configuration of the network function, and creation of the management object instance (MOI) and takes appropriate actions. After completion of the actions, the cloud native management system 104 sends the create network function response to the consumer. The cloud native management system 104 maintains relevant information associated with a state of the request, and a path is opened up for the consumer to invoke functionality of the solution.

In addition to the above, the create network function request may include a number of attributes that the cloud native management system 104 utilizes in determining a target infrastructure solution to use in fulfilling the request. For example, in one or more embodiments, the create network function request includes location information. The location information may refer to a physical location of where the network function is to be instantiated. The granularity of the location information may be different between different implementations, and may include different types of location information (e.g., geographic location, coordinates, or an indication of an edge network or the cloud).

As another example, attribute(s) of the request may include a CIMS provider (e.g., an infrastructure solution) to be used. In this example, the cloud native management system 104 may support use of services provided by one or more CIMS and, where the request includes an identification of one of the supported services, the cloud native management system 104 may select the appropriate infrastructure solution to fulfill the request. In one or more embodiments, the request may include a listing of multiple solutions, which allows the cloud native management system 104 to determine one of multiple possible infrastructure solutions in fulfilling the request.

In one or more embodiments, attribute(s) of the request include network function package information. This attribute may enable the consumer to indicate which package or resource is to be used for initiation of the network function. This enables the cloud native management system 104 to determine the appropriate target infrastructure (and associated API) to use in exposing the services to the consumer.

In addition to the create network function request, the request may refer to a modify network function request. In this example, the modify network function request may include similar components as the ModifyMOIAttributes request defined in 3GPP TS 28.533 with some modifications. In this example, the consumer may send the request when requesting a change of configuration of an already deployed network function. The request may include a list of attributes to be changed, or a complete list of attributes in the API. The cloud native management system 104 may receive the request with various network related requirements. The cloud native management system 104 may drive the requirements on the associated actions to fulfill the request, including network function management, scaling of the network function, and configuration of the network function. After completion of the actions, the cloud native management system 104 sends a response to the consumer. The cloud native management system 104 may record the configuration changes of the network function into an inventory or other management system (e.g., a component of the cloud native management system 104).

In addition to the above, attributes of the request may include scaling information. This may include information relevant to scaling the NF instance(s). The attributes of the request may additionally include updated package information (e.g. any information relevant to the network function package).

As another example request, the request may refer to a delete network function request. In this example, the delete network function request may include similar components as the DeleteMOI request as defined in 3GPP standards. In this example, the consumer sends the delete network function request to request determination of an already deployed network function. The cloud native management system 104 receives the request and drives the requirements of actions needed including network function termination, deletion of the network function MOI, and takes the identified actions. After completion of the actions, the cloud native management system 104 sends the response to the consumer and removes the network function from the records maintained in the cloud native management system 104 (or other management system).

In addition to the above commands/requests, the cloud native management system 104 provides API support for a variety of additional commands and requests. For example, in one or more embodiments, the request may include an inquiry about available CNF packages or about available deployment sites. Each of these requests may include some of the similar or identical attributes that may be used in selectively identifying a relevant infrastructure solution to fulfill the request by exposing capabilities of the infrastructure solution(s) to the requesting consumer in accordance with one or more embodiments described herein.

In one or more embodiments, the request is a query request. For instance, the request may share similarities with the getMOIAttributes operation as specified in 3GPP standards. The query request may include an attribute list as an input parameter which identified attributes to be returned by the operation. The query may be a query for CIMS that are supported by the cloud native management system 104. The response to this request may include a list of supported CIMS, which the consumer may use in formulating another request (e.g., a create, modify, delete request) in which the consumer invokes a specific LCM or other provisioning operation with respect to a particular infrastructure solution. In one or more embodiments, the cloud native management system 104 includes available information about supported CIMS, which the cloud native management system 104 may provide in response to a query request without necessarily reaching out or reactively discovering CIMS in response to the received query request.

Figure 9:
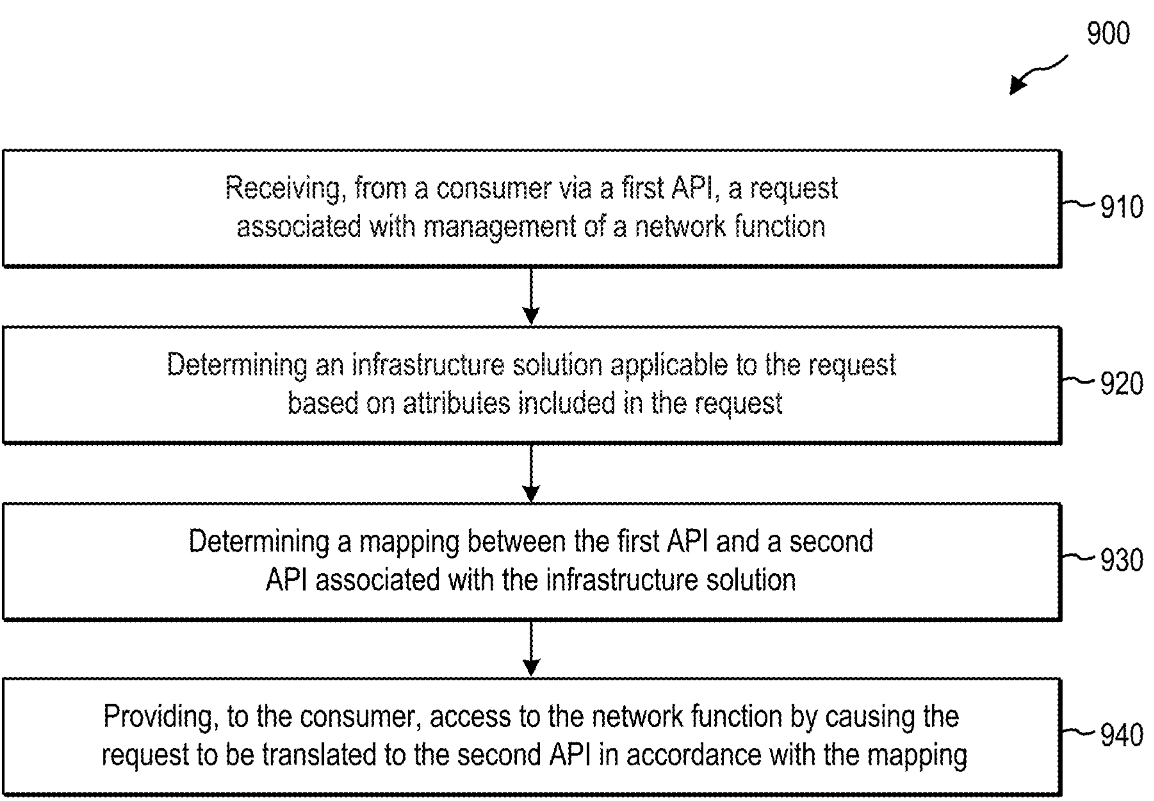
FIG. 9 illustrates an example series of acts for managing CM and/or LCM of cloud-native virtual network functions in accordance with one or more embodiments.

Turning now to FIG. 9, this figure illustrates an example flowchart including a series of acts 900 for managing cloud-native network functions in a telecommunication network in accordance with one or more embodiments. It will be appreciated that acts described herein may be performed in different orders and may include some or all of the acts described in connection with different examples. The acts described herein may be performed as part of a method. In one or more embodiments, a non-transitory computer-readable medium can include instructions thereon that, when executed by one or more processors, cause a server device and/or client device to perform the acts described herein. In one or more embodiments, a system can perform the acts described herein.

FIG. 9 illustrates a series of acts 900 for receiving and processing a request from a consumer involving management of a network function to be provided using one of a variety of infrastructure solutions. As shown in FIG. 9, the series of acts 900 includes an act 910 of receiving, from a consumer via a first API, a request associated with management of a network function. In one or more embodiments, the act 910 includes receiving, from an authorized consumer via a first application programming interface (API), a request associated with management of a network function, the request including one or more attributes associated with deployment of the network function.

As further shown in FIG. 9, the series of acts 900 includes an act 920 of determining an infrastructure solution applicable to the request based on attributes included in the request. In one or more embodiments, the act 920 includes determining an infrastructure solution applicable to the request based on the one or more attributes included in the request.

As further shown in FIG. 9, the series of acts 900 includes an act 930 of determining a mapping between the first API and a second API associated with the infrastructure solution. In one or more embodiments, the act 930 includes determining a mapping between the first API and a second API associated with the infrastructure solution applicable to the request.

As further shown in FIG. 9, the series of acts 900 includes an act 940 of providing, to the consumer, access to the network function by causing the request to be translated to the second API in accordance with the mapping. In one or more embodiments, the act 940 includes providing, to the authorized consumer, one or more services to manage the network function by causing the request to be translated to the second API associated with the infrastructure solution in accordance with the mapping between the first API and the second API.

In one or more embodiments, the first API is a standards-defined API, the infrastructure solution is an open-source solution, and the second API is an open source API. In one or more embodiments, the first API is a standards-defined API, the infrastructure solution is a proprietary solution, and the second API is a proprietary API that is not standards-defined.

In one or more embodiments, the request is a create request associated with creating an instance of the network function using the infrastructure solution. In this example, the one or more attributes of the request include one or more of location information associated with a physical location where the network function is to be instantiated and/or an identification of a cloud infrastructure management service provider. In one or more embodiments, determining the infrastructure solution includes facilitating the authorized consumer to indicate which packages or resources are to be used for initiation of the network function.

In one or more embodiments, the request is a modify request associated with modifying an instance of the network function using the infrastructure solution. In this example, the one or more attributes of the request may include one or more of scaling information associated with scaling one or more instances of the network function and/or updating information associated with the network function.

In one or more embodiments, the request is a query request associated with the network function with the one or more attributes including a request for available packages. In one or more embodiments, the request is a delete request with the one or more attributes including an identifier of the infrastructure solution.

In one or more embodiments, the request associated with management of the network function includes a request associated with lifecycle management (LCM) of the network function. In this example, providing one or more services to manage the network function may include facilitating access to LCM-based management functions via the first API while authorizing consumer access to other types of management functions via the second API.

In one or more embodiments, the request associated with management of the network function includes a request associated with configuration management (CM) of the network function. In this example, providing one or more services to manage the network function includes providing a CM service via the first API while providing access to other types of management function services via the second API.

In one or more embodiments, determining the infrastructure solution applicable to the request includes determining that the infrastructure solution is not a standards-defined infrastructure solution. In this example, determining the mapping between the first API and the second API and providing the one or more services to manage the network function may be based on the infrastructure solution not being the standards-defined infrastructure solution. In one or more embodiments, determining the infrastructure solution includes determining that the infrastructure solution is not supported by a European Telecommunications Standards Institute Network Functions Virtualization Management and Orchestration (ETSI NFV MANO) solution.

In one or more embodiments, the first API is unified API applicable to both lifecycle management (LCM) functions and configuration management (CM) functions of the network function. In one or more embodiments, the network function is deployed in a core network of a fifth generation (5G) telecommunications network. In one or more embodiments, the network function is deployed in a radio access network (RAN) portion of the 5G telecommunications network.

Figure 10:
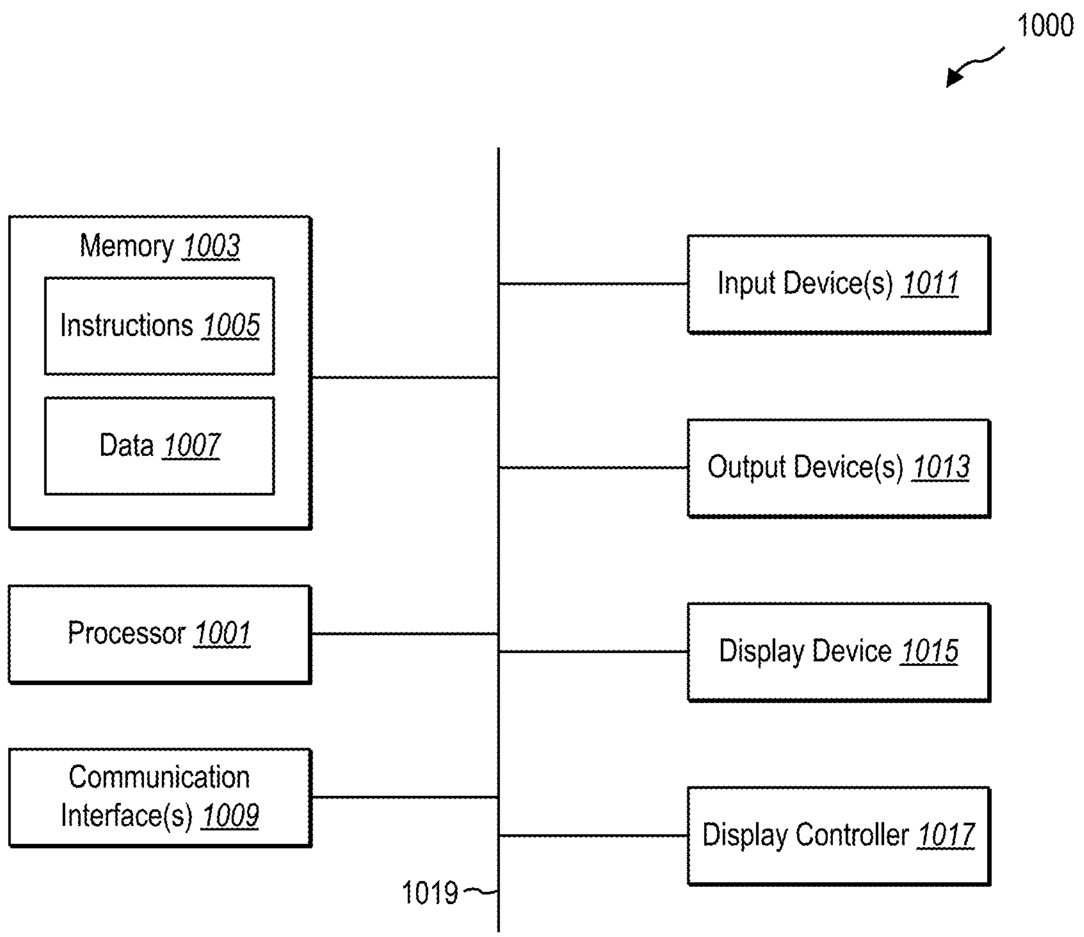
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for managing cloud native network functions in a multi-infrastructure environment, the method comprising:

receiving, from an authorized consumer via a first application programming interface (API), a request associated with management of a network function, the request including one or more attributes associated with deployment of the network function, wherein the request associated with management of the network function includes a request associated with lifecycle management (LCM) of the network function;

determining an infrastructure solution applicable to the request based on the one or more attributes included in the request and based on the request being associated with the LCM of the network function;

determining a mapping between the first API and a second API associated with the infrastructure solution applicable to the request; and providing, to the authorized consumer, one or more services to manage the network function by causing the request to be translated to the second API associated with the infrastructure solution in accordance with the mapping between the first API and the second API, wherein providing one or more services to manage the network function includes facilitating access to LCM-based management functions via the second API while authorizing consumer access to other types of management functions via one or more additional APIs.

2. The method of claim 1, wherein the first API is a standards-defined API, wherein the infrastructure solution is an open-source solution, and wherein the second API is an open source API.

3. The method of claim 1, wherein the first API is a standards-defined API, wherein the infrastructure solution is a proprietary solution, and wherein the second API is a proprietary API that is not standards-defined.

4. The method of claim 1, wherein the request is a create request associated with creating an instance of the network function using the infrastructure solution, wherein the one or more attributes of the request include one or more of:

location information associated with a physical location where the network function is to be instantiated; or an identification of a cloud infrastructure management service provider.

5. The method of claim 4, wherein determining the infrastructure solution includes facilitating the authorized consumer to indicate which packages or resources are to be used for initiation of the network function.

6. The method of claim 1, wherein the request is a modify request associated with modifying an instance of the network function using the infrastructure solution, wherein the one or more attributes of the request include one or more of:

scaling information associated with scaling one or more instances of the network function; or updating information associated with the network function.

7. The method of claim 1, wherein the request is a query request associated with the network function, and wherein the one or more attributes includes a request for available packages.

8. The method of claim 1, wherein the request is a delete request, and wherein the one or more attributes includes an identifier of the infrastructure solution.

9. The method of claim 1, wherein the request associated with management of the network function further includes a request associated with configuration management (CM) of the network function, wherein determining the infrastructure solution applicable to the request is further based on the request being associated with the network function, wherein providing one or more services to manage the network function includes providing a CM service via at least one of the second API or the one or more additional APIs.

10. The method of claim 1, wherein determining the infrastructure solution applicable to the request includes determining that the infrastructure solution is not a standards-defined infrastructure solution, wherein determining the mapping between the first API and the second API and providing the one or more services to manage the network function is based on the infrastructure solution not being the standards-defined infrastructure solution.

11. The method of claim 10, wherein determining the infrastructure solution includes determining that the infrastructure solution is not supported by a European Telecommunications Standards Institute Network Functions Virtualization Management and Orchestration (ETSI NFV MANO) solution.

12. The method of claim 1, wherein the first API is unified API applicable to both lifecycle management (LCM) functions and configuration management (CM) functions of the network function.

13. The method of claim 1, wherein the network function is deployed in one of:

a core network of a fifth generation (5G) telecommunications network; or a radio access network (RAN) portion of the 5G telecommunications network.

14. A system, comprising:

one or more processors;

memory in electronic communication with one or more processors; and instructions stored in the memory, the instructions being executable by the one or more processors to:

receive, from an authorized consumer via a first application programming interface (API), a request associated with management of a network function, the request including one or more attributes associated with deployment of the network function, wherein the request associated with management of the network function includes a request associated with lifecycle management (LCM) of the network function;

determine an infrastructure solution applicable to the request based on the one or more attributes included in the request and based on the request being associated with the LCM of the network function;

determine a mapping between the first API and a second API associated with the infrastructure solution applicable to the request; and provide, to the authorized consumer, one or more services to manage the network function by causing the request to be translated to the second API associated with the infrastructure solution in accordance with the mapping between the first API and the second API, wherein providing one or more services to manage the network function includes facilitating access to LCM-based management functions via the second API while authorizing consumer access to other types of management functions via one or more additional APIs.

15. The system of claim 14, wherein the first API is a standards-defined API, wherein the infrastructure solution is an open-source solution, and wherein the second API is an open source API.

16. The system of claim 14, wherein the first API is a standards-defined API, wherein the infrastructure solution is a proprietary solution, and wherein the second API is a proprietary API that is not standards-defined.

17. The system of claim 14, wherein the request associated with management of the network function further includes a request associated with configuration management (CM) of the network function, wherein determining the infrastructure solution applicable to the request is further based on the request being associated with the network function, wherein providing one or more services to manage the network function includes providing a CM service via at least one of the second API or the one or more additional APIs.

18. In a fifth generation (5G) telecommunications network including cloud native network functions, a method for managing the cloud native network functions in a multi-infrastructure environment, the method comprising:

receiving, from an authorized consumer via a first application programming interface (API), a request associated with management of a network function implemented in the 5G telecommunications network, the request including one or more attributes associated with deployment of the network function, wherein the request associated with management of the network function includes a request associated with lifecycle management (LCM) of the network function;

determining an infrastructure solution applicable to the request based on the one or more attributes included in the request and based on the request being associated with the LCM of the network function;

determining a mapping between the first API and a second API associated with the infrastructure solution applicable to the request; and providing, to the authorized consumer, one or more services to manage the network function by causing the request to be translated to the second API associated with the infrastructure solution in accordance with the mapping between the first API and the second API, wherein providing one or more services to manage the network function includes facilitating access to LCM-based management functions via the second API while authorizing consumer access to other types of management functions via one or more additional APIs.

* * * * *